(12) United States Patent
Morim Figueiredo Ramôa et al.

(10) Patent No.: US 10,947,665 B2
(45) Date of Patent: Mar. 16, 2021

(54) CORK YARN, PRODUCTION METHOD AND USES

(71) Applicants: SEDACOR-SOCIEDADE EXPORTADORA DE ARTIGOS DE CORTIÇA, LDA, S. Paio de Oleiros (PT); TÊXTEIS PENEDO S.A., Guimarães (PT)

(72) Inventors: Ana Florinda Morim Figueiredo Ramôa, Vila Nova de Famalicão (PT); Maria Da Graça Correia De Oliveira Bonifácio Sotto Mayor Pizarro, Vila Nova de Famalicão (PT); José De Almeida Morgado, Vila Nova de Famalicão (PT); Sónia Oliveira Prozil, Vila Nova de Famalicão (PT); Manuel Fernando Ribeiro Pereira, Oporto (PT); Olívia Salomé Gonçalves Pinto Soares, Oporto (PT); Patricia Sofia Ferreira Ramalho, Oporto (PT); Carlos Alberto Mendes Pinto De Sá, Paio de Oleiros (PT); Vera Lúcia Regadas Pinto De Sá, Paio de Oleiros (PT); Sandra Gabriela Coutos Dos Santos Ventura, Guimarães (PT); João Silva Abreu, Guimarães (PT)

(73) Assignees: SEDACOR-SOCIEDADE EXPORTADORA DE ARTIGOS DE CORTIÇ, S. Paio de Oleiros (PT); TÊXTEIS PENEDO S.A., Guimarães (PT)

( * ) Notice: Subject to any disclaimer, the term of this patent is extended or adjusted under 35 U.S.C. 154(b) by 121 days.

(21) Appl. No.: 16/073,990
(22) PCT Filed: Jan. 30, 2017
(86) PCT No.: PCT/IB2017/050485
§ 371 (c)(1),
(2) Date: Jul. 30, 2018

(87) PCT Pub. No.: WO2017/130170
PCT Pub. Date: Aug. 3, 2017

(65) Prior Publication Data
US 2019/0040573 A1 Feb. 7, 2019

(30) Foreign Application Priority Data

Jan. 29, 2016 (PT) .......................................... 109121

(51) Int. Cl.
*D06N 3/00* (2006.01)
*D06M 15/01* (2006.01)
(Continued)

(52) U.S. Cl.
CPC ............. *D06N 3/0061* (2013.01); *C09D 7/65* (2018.01); *C09D 7/68* (2018.01); *C09D 133/04* (2013.01);
(Continued)

(58) Field of Classification Search
CPC .......... C09D 175/04; C09D 7/68; C09D 7/64; C09D 7/40; C09D 133/04; D02G 3/404;
(Continued)

(56) References Cited

U.S. PATENT DOCUMENTS 2,231,129 A 2/1941 Levy

FOREIGN PATENT DOCUMENTS

| CH | 705877 A1 | 6/2013 |
| GB | 26622 A | 11/1912 |

(Continued)

OTHER PUBLICATIONS

Lília Rosa dos Santos Pinto de Almeida "Desenvolvimento de estruturas têxteis com elevado isolamento térmico" May 1, 2014 https://repositorioaberto.up.pt/bitstream/10216/71356/1/000141308.pdf Acedido em: Oct. 6, 2016. Feb. 2010.

*Primary Examiner* — Camie S Thompson
(74) *Attorney, Agent, or Firm* — Leason Ellis LLP

(57) ABSTRACT

The present disclosure refers to a cork yarn, in particular a yarn with incorporated cork, textile structures comprising said yarn, obtention method and uses thereof.

The cork yarn described in the present disclosure is useful to the textile and clothing industry, and can be applied exten- (Continued)

sively in the textile industry namely in the manufacture of fabrics for clothing and home textiles, in particular technical clothing, duvets, blankets, covers, etc.

17 Claims, 3 Drawing Sheets

(51) Int. Cl.
| | |
|---|---|
| *D06M 15/248* | (2006.01) |
| *D06M 15/263* | (2006.01) |
| *D06M 15/333* | (2006.01) |
| *D06M 15/564* | (2006.01) |
| *D06M 15/59* | (2006.01) |
| *D06M 15/643* | (2006.01) |
| *D06M 23/08* | (2006.01) |
| *D06M 15/227* | (2006.01) |
| *D06M 15/51* | (2006.01) |
| *D02G 3/40* | (2006.01) |
| *D02G 3/36* | (2006.01) |
| *C09D 7/65* | (2018.01) |
| *C09D 7/40* | (2018.01) |
| *C09D 133/04* | (2006.01) |
| *C09D 175/04* | (2006.01) |
| *D06M 15/233* | (2006.01) |
| *D06N 3/04* | (2006.01) |
| *D06N 3/06* | (2006.01) |
| *D06N 3/12* | (2006.01) |
| *D06N 3/14* | (2006.01) |

(52) U.S. Cl.
CPC ............. *C09D 175/04* (2013.01); *D02G 3/36* (2013.01); *D02G 3/404* (2013.01); *D06M 15/01* (2013.01); *D06M 15/227* (2013.01); *D06M 15/233* (2013.01); *D06M 15/248* (2013.01); *D06M 15/263* (2013.01); *D06M 15/333* (2013.01); *D06M 15/51* (2013.01); *D06M 15/564* (2013.01); *D06M 15/59* (2013.01); *D06M 15/643* (2013.01); *D06M 23/08* (2013.01); *D06N 3/042* (2013.01); *D06N 3/045* (2013.01); *D06N 3/06* (2013.01); *D06N 3/125* (2013.01); *D06N 3/128* (2013.01); *D06N 3/14* (2013.01); *D06N 2211/10* (2013.01); *D06N 2211/122* (2013.01); *D06N 2211/14* (2013.01)

(58) Field of Classification Search
CPC .... D02G 3/36; D06M 15/233; D06M 15/333; D06M 15/59; D06M 15/564; D06M 15/227; D06M 23/08; D06M 15/643; D06M 15/01; D06M 15/248; D06M 15/263; D06N 2211/10; D06N 3/042; D06N 3/045; D06N 3/06; D06N 3/125; D06N 3/128; D06N 3/14; D06N 2211/122; D06N 3/0061; D06N 3/12; D06N 3/04
USPC .......................................... 428/372, 378, 278
See application file for complete search history.

(56) References Cited

FOREIGN PATENT DOCUMENTS

| | | |
|---|---|---|
| GB | 509196 A | 7/1939 |
| WO | 2002/055767 A1 | 7/2002 |

A

B

100
CORK YARN, PRODUCTION METHOD AND USES

CROSS-REFERENCE TO RELATED APPLICATIONS

This application is a U.S. National Stage Application under 35 U.S.C. § 371 of International Patent Application No. PCT/IB2017/050485, filed Jan. 30, 2017, which claims priority to Portugal Application No. 109121, filed Jan. 29, 2016, which are hereby incorporated by reference in their respective entireties.

TECHNICAL FIELD

The present disclosure refers to a cork yarn, in particular a yarn with cork incorporated, textile structures comprising said yarn, obtention method and uses thereof.

The cork yarn described in the present disclosure is useful to the textile and clothing industry, and can be applied extensively in the textile industry namely in the manufacture of fabrics for clothing and home textiles, in particular technical clothing, duvets, blankets, covers, etc.

BACKGROUND

The current market offer is devoid of textile substrates with incorporation of high quantity of chemically bound cork. In the market there is a wide range of products named cork fabrics and cork yarns, used in textile products and leather goods, but that in reality are found to be thin sheets of natural or agglomerate cork (usually with a thickness in the order of millimetres) laminated with woven fabrics and non-woven fabrics and also tapes derived from the cutting of those laminated sheets with thicknesses in the order of 3 to 10 mm, as the yarn described in document EP1358370A1.

There are some products on the market, namely:
  Suberis® consisting of a soft, washable, impervious and fireproof structure/cork sheet laminated with woven or non-woven fabric; being used for various applications, namely clothing, leather goods, automotive and furnishing and decoration;
  Suberis® yarn—tape manufactured from a cork sheet with a width of 3 to 10 mm. This tape in order to be used must bear a longitudinal seam manufactured with synthetic thread or be twisted with other tape having in its interior (core) a synthetic yarn to provide support to it;
  Corkshell—textile structure with three layers wherein the cork (in macro-grain scale) is lodged in the intermediate layer of the fabric, having an exterior fabric and an interior fabric. It should be noted that upon analysis of a sample of this structure the consortium found that there is no chemical bonding between the cork granules and the various textile elements;
  Pelcor—the company presents a collection of accessories, in cork leather, for different situations, including purses, wallets, belts, umbrellas and various pouches;
  Artelusa—the company presents from products for office to purses and wallets, belts and diversified jewelry. It has no clothing;
  Nike Sportswear—developed sneakers for basketball using genuine cork to cover all its outside;
  Dyn Cork (trademark of the company SEDACOR) owns cork fabrics, based on a laminated sheet of natural cork. It further owns a cork yarn obtained through a cork tape longitudinally seamed with a core of synthetic yarn.

It has been found that the main applications of these products are furnishing, automotive upholstery, purses, wallets, belts, hats and small jewelry.

These products illustrate the technical problem to be solved by the present solution.

GENERAL DESCRIPTION

The state of the art analysis allows verifying that the current market offer concerning textile products and leather goods based on cork is mainly focused on thin sheets of natural or agglomerate cork, usually with a thickness in the order of millimetres, laminated with fabrics and non-woven fabrics and also tapes or yarns obtained from the cutting of those laminated sheets that afterwards were folded and seamed and have thicknesses in the order of 3 to 10 mm.

The products of the state of the art may be applied to furnishing products, automotive upholstery, purses, wallets, belts, hats and small jewelry. However, the use of the products in the textile industry namely clothing and home textiles is unknown, since there are various related problems. Said problems are associated to the lack of flexibility and malleability of the cork sheets for use in clothing, which results in a difficulty to fold them, these becoming brittle; difficulties to seam these materials; lack of breathability of the material which makes it completely inadequate for use in clothing; not very soft touch, as well as problems with their conservation and care, which limits their use in the final products of the textile cluster (clothing and home textiles). In relation to the cork yarns existing in the market, it can be observed that they are tapes derived from the cutting of laminated cork sheets, folded and seamed which makes them extremely thick, with low malleability and flexibility, that makes them impossible to process with the conventional techniques of manufacture of woven and knitted fabrics. Therefore, the use of the current textile products is made impossible, whether on clothing or home textiles, since their performance versus applicability is not satisfactory.

Within the scope of the present disclosure textile structure is understood as a fabric, non-woven fabric or knitted fabric from yarns or natural or synthetic fibres. Within the scope of the present disclosure fabric is understood as any natural or synthetic fibre yarn-based material used in the manufacturing of clothes, table linen, cleaning cloths, medicinal use like bands and bandages, among others. Therefore, the present disclosure solves the following problems:
  non-existence of textile substrates, in particular yarns, woven fabrics, non-woven fabrics and knitted fabrics, with high incorporation of cork chemically bound to the textile substrate;
  lack of malleability, flexibility and thinness of the cork tapes to be processed by the conventional textile technologies, in particular knitting, weaving, among others;
  lack of flexibility and malleability of the cork sheets for use in clothing, which results in a difficulty to fold them, these becoming brittle;
  difficulties in seaming the cork sheets;
  insufficient breathability of the cork sheets which makes them completely inadequate for use in clothing;
  not very soft touch of the cork sheets;
  problems with the conservation and care of the cork sheets, which limits their use in the end products of the textile cluster, in particular clothing and home textiles.

The present disclosure introduces an innovative concept in relation to textile materials with cork, in particular yarns, woven fabrics, non-woven fabrics and knitted fabrics, since unlike the currently existing products on the market that are obtained by lamination of fine sheets of cork with a textile substrate. The cork yarn, and the textile materials with cork herein disclosed incorporate a high quantity of cork in a reactive way, i.e. chemically bound to the textile substrate making them unique and differentiating products with regard to the state of the art.

Within the scope of the present disclosure yarn-type structures coated with microparticles/granules of cork are developed, through processes of coating by reactive action. The present disclosure refers to textile yarns, such as for example cotton, linen, wool, silk, polyamide, polyester, polyethylene, polyurethane and combinations thereof, which may be of natural fibre or synthetic fibre, said textile yarns comprising microparticles of cork wherein these may bind to the textile yarn through a binder.

One of the aspects of the present disclosure refers to a cork yarn comprising textile yarn of fibre (natural or non-natural, for example synthetic) and at least 2% of cork particles ($wt_{cork}/wt_{final\ yarn}$) and a polymeric binder to bind the cork particles to the textile yarn, wherein the cork particles have a granulometry of size less than 1 mm. Preferably at least 15% of cork particles ($wt_{cork}/wt_{final\ yarn}$); more preferably at least 20% of cork particles ($wt_{cork}/wt_{final\ yarn}$); even more preferably at least 25% of cork particles ($wt_{cork}/wt_{final\ yarn}$).

The weight of the final yarn is the textile yarn of fibre (natural or non-natural, for example synthetic) with the paste, i.e. weight of the yarn, weight of the cork particles, weight of the binder and/or additives, among others.

The cork yarn of the present disclosure may be processed obtaining structures of knitted fabrics or woven fabric, malleable, breathable wherein the obtained fabric has features of resistance, breathability, flexibility and improved lightness these features being maintained after washes. These new structures are especially adequate for clothing, duvets, blankets and other technical solutions due to the thermal/mechanical properties of the new fabric.

In an embodiment for better results, the cork yarns may comprise between 2%-50% of cork particles ($wt_{cork}/wt_{final\ yarn}$), namely microparticles, in particular of 5-20% of cork particles ($wt_{cork}/wt_{final\ yarn}$), 5-10% of cork particles ($wt_{cork}/wt_{final\ yarn}$).

In the present disclosure, a yarn is considered to be a set of interlaced fibres, forming a cylinder of irregular diameters along its length. This big irregularity revealed in the mentioned diameters becomes impossible to measure with a naked eye or, even, with the help of micrometric devices. These yarns may be used for weaving, or manufacturing fabrics.

In an embodiment for better results, the cork yarns herein disclosed may be coated with a coating bath or paste that may comprise from 5 to 50 g/l of a polymeric binder selected from the following list: thermoplastic resins, thermosetting resins; and/or glyoxal resins, namely: polyurethane, acrylate, isocyanates and polyoles.

In an embodiment for better results, cork yarns, may further be used fixatives, thickeners, softeners, stabilizers, colorants.

In an embodiment for better results, the incorporation of a quantity of cork additives has been reached (or cork particles) in the textile substrates, in particular cork yarns, with a percentage of additives/cork particles≥18%, ($wt_{cork}/wt_{final\ yarn}$), and another percentage of 10 to 50% ($wt_{cork}/wt_{final\ yarn}$) in the woven and knitted fabrics.

In an embodiment, the cork yarn described in the present disclosure obtained an increase of the breaking and elongation strength, in particular N (Newton)≥7.8% comparatively to a fabric produced with the same yarn but without cork.

In an embodiment, the cork yarn described in the present disclosure obtained an increase of the pilling (from Portuguese borboto) resistance comparatively to a fabric produced with the same yarn but without cork.

In an embodiment, with the cork yarn described in the present disclosure an increase of the washing fastness above 20 cycles was obtained, carried out in particular at 40° C.

In an embodiment, with the cork yarn described in the present disclosure an increase of the malleability and flexibility of the textile substrates of fabrics, non-woven fabrics and knitted fabrics was obtained, comparatively to a tape or cork cord.

In an embodiment, the cork yarn described in the present disclosure obtained an increase of the malleability, flexibility and thinness of the cork textile yarns that allowed their processing through conventional technologies for the obtention of fabrics and knitted fabrics.

In an embodiment, with the cork yarn described in the present disclosure it was possible to obtain the easiness to seam (from Portuguese costurabilidade) of the woven fabrics and knitted fabrics.

The products developed and resulting from the use of the cork yarn described in the present disclosure have several advantages over the products already existing in the market, namely the following:

in the case of woven fabrics, non-woven fabrics and knitted fabrics they have advantage in terms of flexibility, breathability and easiness to seam, possibility of washing without deformations, in particular up to 40 washes and antibacterial character;

in the case of the yarns these have a thickness and flexibility suitable for textile processing, contrary to the current state of the art, thus permitting the production of new textile substrates and products, non-existing in the current market;

good performance of the fabrics developed with the cork yarn with regard to the dimensional stability, pilling resistance, breaking and elongation strength and thickness;

breaking and elongation strength (N): it increased 7.8% comparatively to a fabric produced with the same yarn but without cork;

pilling resistance: it increased around 0.5% (on a scale of 0 to 5) comparatively to a fabric produced with the same yarn but without cork;

the fabric with cork is respirable and by comparison with a similar fabric though without cork, it has a resistance to the water vapour about 9% less (this means that it is more breathable);

thermal resistance (Rct)≥0.750 ($m^2 \cdot K/W$)—midseason duvet;

good dimensional stability to wash, thinness suitable to its use in textile articles;

they may be easily seamed in conventional machines maintaining the flexibility of a fabric without cork.

It should be added that the use of the cork particles instead of using cork sheets, as it is disclosed in the state of the art, also has a character of reuse and better use of subproducts and as a consequence they may have a more affordable price, while at the same time it promotes the concept of eco-friendly and sustainability.

In an embodiment, the granulometry of the cork used in the present disclosure may vary between 0.001 and 0.85 mm, preferably between 0.4-0.7 mm.

The measurement of the granulometry/particle size/cork granule may be carried out in various ways, in this disclosure the measurement granulometry/particle size was carried out on the basis of the standard the granulometry analysis by mechanical sieving, namely the one described by NP ISO 2030 of June, 2011. In particular concerning the sizes of the particles obtained by the sieves specified in item 4.1.2 whose openings are in accordance with series ISO/R 40/3 (see ISO 565 of 1990).

The present disclosure allows obtaining with the cork yarn described a product in which the features of the textile are maintained while simultaneously it is possible to increase the breaking resistance and the increase of the elongation, the dimensional stability and the antibacterial activity of the textile with cork, and also the resistance to thermal variations.

The present disclosure relates to a cork yarn of natural or non-natural fibre, e.g. synthetic, comprising at least 2% of cork particles ($wt_{cork}/wt_{final\ yarn}$) and a suitable polymeric binder that binds the cork particles to the textile yarn wherein the cork particles comprise a granulometry less than 1 mm.

One of the aspects of the present invention relates to a cork yarn comprising textile yarn of fibre (natural or non-natural) and at least 2% of cork particles ($wt_{cork}/wt_{final\ yarn}$) and a polymeric binder for binding the cork particles to the textile yarn wherein the cork particles have a granulometry of size less than 1 mm.

In an embodiment, the cork yarn herein disclosed has a linear density, measured in tex less 197 tex (Ne 3/1), preferably less than 118 tex (Ne 20/1), even more preferably between 15×2 tex (Ne 40/2) and 40×2 tex (Ne 30/2), in particular 30×2-33×2 tex (Ne 20/2-Ne 36/2).

In an embodiment, the linear density resulting from the cork yarns may refer to a single yarn or with 2 or more twisted cables. Yarns formed by two or more yarns (or cables), which have been twisted with each other, are named twisted yarns.

Usually, the linear density of a textile yarn is represented by a number that expresses a relation between a given length and the corresponding weight. The tex linear density of a yarn is equal to the weight in grams of 1000 metres of yarn. Such is the representation recommended by the International System of Units (SI), since the length is the measure of 1000 metres of material. Therefore the material that presents mass of 1 gram in such length, will have as linear density 1 tex and so forth. The Number English (Ne) of a yarn is equal to the number of bundles of 840 yards (768 metres) each, necessary to obtain the weight 1 pound (≈454 grams). In the Decimal System Number English of a cotton yarn is equal to the number of bundles of 768 metres each, necessary to obtain a weight of 454 grams.

In an embodiment for better results, the cork yarn herein disclosed may comprise at least 5% of cork particles ($wt_{cork}/wt_{final\ yarn}$), at least 10% of cork particles ($wt_{cork}/wt_{final\ yarn}$), preferably at least 15% of cork particles ($wt_{cork}/wt_{final\ yarn}$), even more preferably at least 20% of cork particles ($wt_{cork}/wt_{final\ yarn}$).

In an embodiment for better results, said cork particles may present a granulometry less than 0.85 mm, preferably less than 0.8 mm.

In an embodiment for better results, said cork particles may further present a granulometry between 0.001-0.5 mm, preferably between 0.05-0.5 mm.

In an embodiment for better results, the suitable polymeric binder that binds the cork particles to the textile yarn may comprise polyurethane, or acrylate, or combinations thereof, among others.

In an embodiment for better results, said binder may be selected from the following list: thermoplastic resins, namely PVC, PU; thermosetting resins, in particular polyvinyl chloride, polyvinyl acetate, acrylic polyesters, polystyrene, polyethylene, polyamide, polyurethane; glyoxal resins; waxes; paraffins; silicones; and combinations thereof, among others.

In an embodiment for better results, the yarn herein disclosed may further comprise fixatives, thickeners, softeners, stabilizers, colorants, or combinations thereof.

In an embodiment for better results, the textile yarn may be selected from a list constituted by cotton, linen, wool, silk, viscose, acetate, polyamide, polyester, acrylic, elastane, polyethylene, polyurethane and combinations thereof, among others.

The present disclosure further refers to a knitted fabric or a woven fabric that may comprise the cork yarn herein disclosed.

The disclosure further relates to a composition for coating bath or paste for a coating of the textile yarn described herein disclosed. Said composition for coating bath or paste may comprise 5 to 50 g/l of a suitable polymeric binder and 5 to 100 g/l of cork particles with a granulometry less than 1 mm, preferably 10 to 40 g/l of a suitable polymeric binder and 20 to 70 g/l of cork particles, even more preferably of 20 to 30 g/l of a suitable polymeric binder and 40 to 60 g/l of cork particles.

In an embodiment, the composition herein disclosed may comprise cork particles comprising a granulometry less than 0.85 mm, preferably less than 0.8 mm.

In an embodiment, the composition herein disclosed may comprise cork particles comprising a granulometry with sizes between 0.001-0.5 mm, preferably between 0.05-0.5 mm.

In an embodiment, the binder may comprise polyurethane, or acrylate, or combinations thereof, among others.

In an embodiment, said binder may be from the following list: thermoplastic resins, namely PVC, PU; thermosetting resins, in particular polyvinyl chloride, polyvinyl acetate, acrylic polyesters, polystyrene, polyethylene, polyamide, polyurethane; glyoxal resins; waxes; paraffins; silicones; and combinations thereof.

In an embodiment, the composition may further comprise fixatives, thickeners, softeners, stabilizers, colorants, or combinations thereof, among others.

The present disclosure further refers to a woven fabric, a knitted fabric and a non-woven fabric coated with the composition described previously.

The disclosure concerned is also related to articles that may comprise textile materials, yarns, woven fabric, knitted fabric and non-woven fabrics described previously, and the articles may comprise decoration articles, bed linen, blankets, mattresses, curtains, clothing and/or technical articles, among others.

The present disclosure also relates to a process for depositing the cork particles in a textile structure, knitted fabric or non-woven fabric, and that may comprise the following steps, namely deposition of a coating bath or paste by knife coating on said textile, knitted fabric or non-woven fabric structures.

In an embodiment, the process herein disclosed may further comprise one step of drying and/or setting, preferably a step of thermosetting.

The present disclosure also relates to a process for depositing the cork particles onto the textile yarn and it may comprise a step of passing the yarn through a coating bath or paste, by ecloning, spraying or immersion, and said process may further comprise a step of drying and/or setting, preferably thermosetting.

Throughout the description and claims the word "comprises" and variations thereof, are not intended to exclude other technical features, as other components, or steps. Additional objects, advantages and features of the disclosure will become clear to those skilled in the art after the examination of the description or may be learned by practice of the invention. The following embodiments are for illustrating the description and should not be seen as limiting the scope of the disclosure. Furthermore, the present disclosure covers all possible combinations of specific or preferential embodiments herein described.

BRIEF DESCRIPTION OF THE FIGURES

The following figures provide preferred embodiments for illustrating the description and should not be seen as limiting the scope of the disclosure.

DETAILED DESCRIPTION

The present disclosure relates to the application of different technological processes that resorted to technologies of superficial chemical deposition, namely coating by reactive action. The solutions obtained by adopting the preconized research process are: type-yarn, woven fabric, non-woven fabric and knitted fabric structures, in particular of natural or non-natural origin, in particular synthetic or artificial and coated with cork microparticles/micro-fines/granules.

It is an innovative concept in relation to textile materials with cork, in particular yarns, woven fabrics, non-woven fabrics and knitted fabrics, since unlike the currently existing products on the market that are obtained by lamination of thin sheets of cork with a textile substrate, these incorporate high quantity of cork in reactive form, i.e. chemically bound to the textile substrate, making them unique and differentiating products with regard to the state of the art.

In an embodiment, the following processes may also be used: exhaustion, immersion and/or spraying.

In an embodiment, the following methodology was adopted:
preparation of formula of the coating bath/paste of cork microfines/granules, since the cork alone is not capable of creating bonds of chemical nature with the textile substrates whether they are of natural origin or synthetic, there is the need to prepare coating baths and pastes that allow the stable chemical bond between the cork micro-additives and the textile substrates;

coating baths/pastes have been formulated resorting either to the conventional resins and additives, namely glyoxal resins, thermoplastic resins (PVC, PU, etc.), thermosetting resins, in particular polyvinyl chloride, polyvinyl acetate, acrylic polyesters, polystyrene, polyethylene, polyamide, polyurethane, among others, and other functional additives, for example waxes/paraffins, silicones, among others;

bond between the cork bath/paste and the textile substrates through the coating technology by reactive action, that consists of depositing a polymer in the textile structure to be processed.

In an embodiment, the composition of the coating bath/paste may comprise: cork additive, binder, fixative and thickener.

Figure 1:
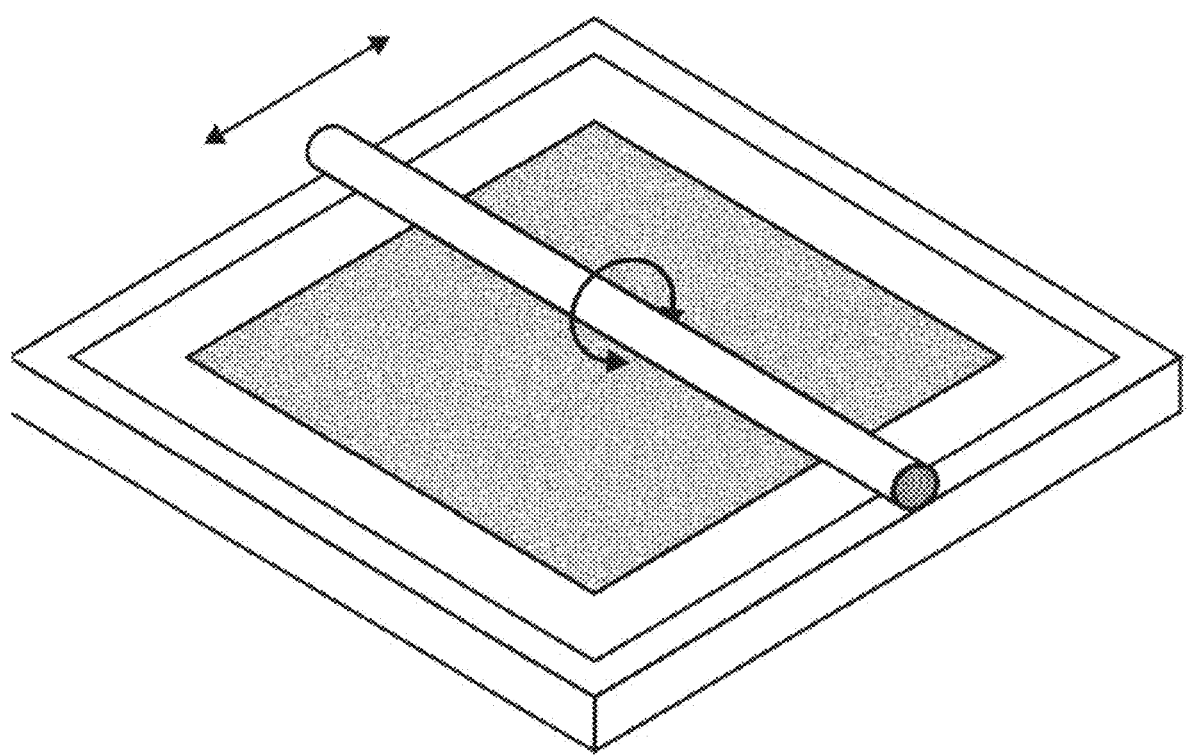
FIG. 1: Representation of a coating of a textile structure of a woven fabric, knitted fabric and non-woven fabric with the composition described in the present disclosure.

In an embodiment, the coating process of the woven fabric, knitted fabric and non-woven fabric structures is carried out according to FIG. 1, wherein after the preparation of the coating bath/paste this one is deposited on the surface through knife coating technology in a quantity necessary to obtain in the end a value of cork additive (cork particles) more than 10% ($wt_{cork}/wt_{final\ yarn}$). Then the coated structure is subject to drying and thermosetting with dry heat (drying machine/stentering machine) during the time necessary for its effective setting.

Figure 2:
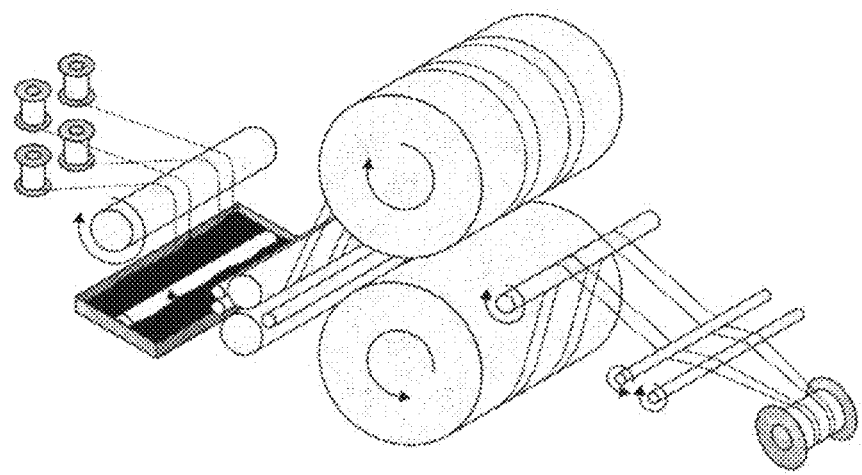
FIG. 2: A and B represent different perspectives of a process for the coating of the textile yarn with the composition described in the present disclosure.
Figure 2:
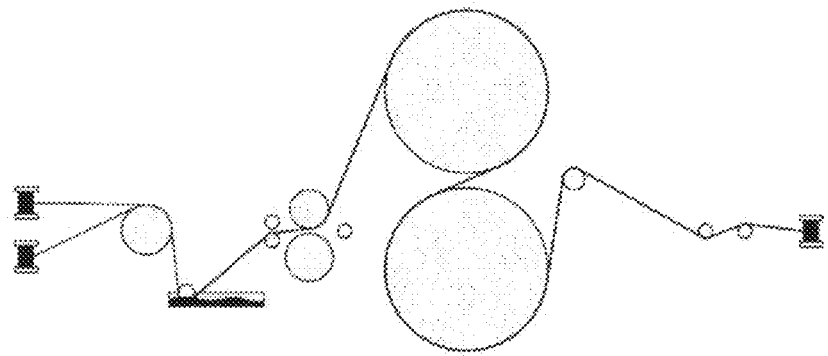
Figure 3:
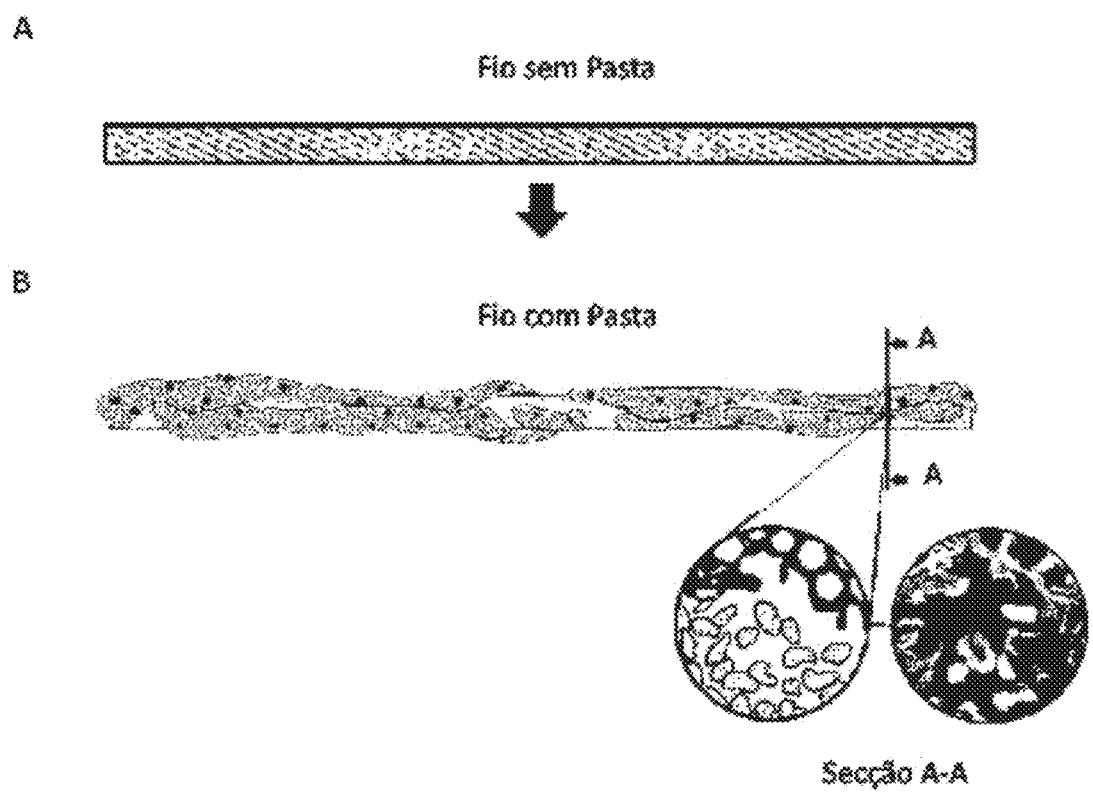
FIG. 3: Representation of an embodiment of the present disclosure wherein A represents a view of the textile yarn without paste and B represents a view of the cork yarn of the present embodiment, i.e. textile yarn with cork coating and cross-section AA of the yarn coated with cork covering paste.

In an embodiment the coating process of yarn is carried out according to FIG. 2. The bath/paste is prepared and placed in the vat of the yarn coating machine. Then, the raw yarns are forced through the vat and "dragged" between 2 rollers of controlled pressure so as to guarantee the superficial deposition of bath uniformly and in a quantity necessary to finally obtain a percentage of more than 2% of cork particles ($wt_{cork}/wt_{final\ yarn}$). Then the yarns are guided between 2 heated rollers where pre-drying takes place and subsequently coiled when exiting the machine. After coating, the yarn can be softened by exhaustion in an autoclave-type equipment.

In an embodiment the processes of application of the coating bath/paste to the textile substrates, as well as its processing parameters, temperature, pressure, time, speeds, among others, have also to be adjusted so as to guarantee the quality of the textile substrates with incorporation of cork. The processing conditions, both in terms of application technology, and in terms of parameters, are different for the various substrates, in particular yarn, woven fabric, non-woven fabric and knitted fabric. In an embodiment, in case there are constraints that prevent the success of this solution there will also be used processes of prior preparation of the materials through the superficial modification promoted by plasma, ozone, ultrasounds, swelling with isopropanol or toluene among others. These treatments help cleaning and activating and adding functionality to the surface of the textile substrates, making them more able to bond chemically.

Another process of applying the pastes may be through spraying.

An example of the present disclosure is presented below. The processes of application of the bath/paste to the textile substrates, as well as its processing parameters, temperature, pressure, time, speeds, among others, have also to be adjusted so as to guarantee the quality of the textile substrates with incorporation of cork.

The processing conditions, both in terms of application technology, and in terms of parameters, were different for the yarns and for the remaining substrates, in particular woven fabric, non-woven fabric and knitted fabric.

In an embodiment, in the case of woven fabrics, nonwoven fabrics and knitted fabrics a cold-end coating made by knife coating and subsequent drying treatment at 100° C. and thermosetting at a temperature of approximately 160° C. may be carried out.

In an embodiment, in the case of the textile yarn, a cold-end coating may be carried out in a yarn coating machine followed by a thermal treatment, in particular drying, in the same equipment through heated rollers.

The products obtained incorporate high quantity of cork in a reactive way, i.e. chemically bonded to the textile substrate, making them unique and differentiating products with regard to the state of the art. Although only particular embodiments of the present disclosure have been represented and described herein, the subject matter expert will know how to introduce modifications and replace some technical features with equivalent ones, depending on the requisites of each situation, without leaving the scope of protection defined by the appended claims.

The presented embodiments are combinable. The following claims set out particular embodiments of the disclosure.

The invention claimed is:

1. A cork yarn suitable for weaving or knitting, comprising: a textile yarn of natural or synthetic fibre, at least 2% cork particles ($wt_{cork}/wt_{final\ yarn}$), and a polymeric binder which binds the cork particles to the textile yarn, wherein the cork particles have a granulometry of size less than 1 mm, wherein the linear density of the cork yarn is less than 197 tex.

2. The cork yarn according to claim 1, wherein the linear density of the cork yarn is less than 118 tex.

3. The cork yarn according to claim 1, wherein the linear density of the cork yarn varies between 15×2 tex and 40×2 tex.

4. The cork yarn according to claim 1, wherein the cork yarn comprises at least 5% cork particles ($wt_{cork}/wt_{final\ yarn}$).

5. The cork yarn according to claim 1, comprising at least 10% of cork particles ($wt_{cork}/wt_{final\ yarn}$).

6. The cork yarn according to claim 1, wherein the cork yarn comprises at least 15% cork particles ($wt_{cork}/wt_{final\ yarn}$).

7. The cork yarn according to claim 1, wherein the cork particles have a granulometry of size less than 0.85 mm.

8. The cork yarn according to claim 1, wherein the cork particles have a granulometry of size less than 0.8 mm.

9. The cork yarn according to claim 1, wherein the cork particles have a granulometry of size between 0.001 mm and 0.5 mm.

10. The cork yarn according to claim 1, wherein the cork particles have a granulometry of size between 0.05 mm and 0.5 mm.

11. The cork yarn according to claim 1, wherein the binder is selected from the group consisting of: polyurethane, acrylate, or combinations thereof.

12. The cork yarn according to the claim 1, wherein the binder is selected from the group consisting of: thermoplastic resins, thermosetting resins, or combinations thereof, wherein the thermoplastic resins comprise polyvinyl chloride and polyurethane, and wherein the thermosetting resins comprise acrylic polyesters, polyurethane, and silicones.

13. The cork yarn according to claim 1, further comprising fixatives, thickeners, softeners, stabilizers, colorants, or combinations thereof.

14. The cork yarn according to claim 1, wherein the textile yarn comprises a mixture of the natural and the synthetic fibres.

15. The cork yarn according to the claim 1, wherein the textile yarn is selected from the group consisting of: cotton, linen, wool, silk, viscose, acetate, polyamide, polyester, acrylic, elastane, polyethylene, polyurethane, or combinations thereof.

16. A fabric comprising a weavable or knittable textile yarn of natural or synthetic fibre, at least 2% cork particles, and a polymeric binder which binds the cork particles to the textile yarn, wherein the cork particles have a granulometry of size less than 1 mm and wherein the linear density of the cork yarn is less than 197 tex.

17. The cork yarn according to claim 1, wherein the binder is selected from the group consisting of: thermoplastic resins, thermosetting resins, or combinations thereof, wherein the thermoplastic resins comprise polyvinyl chloride, polyurethane and polyethylene, and wherein the thermosetting resins comprise silicones and acrylic polyesters.

* * * * *